(12) United States Patent
Zheng et al.

(10) Patent No.: US 12,380,613 B2
(45) Date of Patent: Aug. 5, 2025

(54) MEDICAL IMAGE NOISE REDUCTION METHOD, SYSTEM, TERMINAL, AND STORAGE MEDIUM

(71) Applicant: SHENZHEN INSTITUTES OF ADVANCED TECHNOLOGY, Shenzhen (CN)

(72) Inventors: Hairong Zheng, Shenzhen (CN); Xin Liu, Shenzhen (CN); Na Zhang, Shenzhen (CN); Zhanli Hu, Shenzhen (CN); Dong Liang, Shenzhen (CN); Yongfeng Yang, Shenzhen (CN); Qi Yang, Shenzhen (CN)

(73) Assignee: SHENZHEN INSTITUTES OF ADVANCED TECHNOLOGY, Shenzhen (CN)

(*) Notice: Subject to any disclaimer, the term of this patent is extended or adjusted under 35 U.S.C. 154(b) by 417 days.

(21) Appl. No.: 17/953,356

(22) Filed: Sep. 27, 2022

(65) Prior Publication Data

US 2023/0033666 A1 Feb. 2, 2023

Related U.S. Application Data

(63) Continuation of application No. PCT/CN2020/135431, filed on Dec. 10, 2020.

(51) Int. Cl.
*G06T 11/00* (2006.01)
*G06N 3/0475* (2023.01)
(Continued)

(52) U.S. Cl.
CPC .......... *G06T 11/008* (2013.01); *G06N 3/0475* (2023.01); *G06V 10/30* (2022.01);
(Continued)

(58) Field of Classification Search
CPC ...... G06T 11/008; G06V 10/30; G06V 10/82; G06V 10/776; G06V 10/774; G06V 10/764; G06N 3/0475
See application file for complete search history.

(56) References Cited

U.S. PATENT DOCUMENTS

| 2020/0294287 | A1* | 9/2020 | Schlemper | ........... G06V 10/431 |
| 2022/0164927 | A1* | 5/2022 | Choi | ......................... G06T 5/70 |
| 2023/0301614 | A1* | 9/2023 | Fang | ..................... A61B 6/5205 |

FOREIGN PATENT DOCUMENTS

| CN | 109493951 A | 3/2019 |
| CN | 109674471 A | 4/2019 |

(Continued)

OTHER PUBLICATIONS

J. Y. Zhu, T. Park, P. Isola and A. A. Efros, "Unpaired Image-to-Image Translation Using Cycle-Consistent Adversarial Networks," 2017 IEEE International Conference on Computer Vision (ICCV), Venice, Italy, 2017, pp. 2242-2251, doi: 10.1109/ICCV.2017.244. Accessed via <https://arxiv.org/pdf/1703.10593> (Year: 2017).*

(Continued)

*Primary Examiner* — John Villecco
*Assistant Examiner* — Joshua B. Crockett

(57) ABSTRACT

A medical image noise reduction method, system, terminal and storage medium are disclosed. The method includes: obtaining a standard-dose PET image and a constant-value image; inputting the standard-dose PET image and the constant-value image into a decay function to obtain a corresponding low-dose noisy PET image and a noisy constant-value image, respectively; assembling the low-dose noisy PET image and the noisy constant-value image in a width dimension or a height dimension, and then inputting into a trained conjugate generative adversarial network, and outputting a denoised PET image and constant-value image output by the conjugate generative adversarial network.

12 Claims, 3 Drawing Sheets

(51) Int. Cl.
  *G06V 10/30* (2022.01)
  *G06V 10/764* (2022.01)
  *G06V 10/774* (2022.01)
  *G06V 10/776* (2022.01)
  *G06V 10/82* (2022.01)

(52) U.S. Cl.
  CPC .......... *G06V 10/764* (2022.01); *G06V 10/774* (2022.01); *G06V 10/776* (2022.01); *G06V 10/82* (2022.01)

(56) References Cited

FOREIGN PATENT DOCUMENTS

| | | | | |
|---|---|---|---|---|
| CN | 110298804 A | | 10/2019 | |
| CN | 111178502 A | | 5/2020 | |
| CN | 111968195 A | * | 11/2020 | ........... G06N 3/0454 |
| KR | 102095389 B1 | | 3/2020 | |
| WO | 2020096209 A1 | | 5/2020 | |

OTHER PUBLICATIONS

Anand SS, Singh H, Dash AK. "Clinical Applications of PET and PET-CT". Med J Armed Forces India. Oct. 2009;65(4):353-8. doi: 10.1016/S0377-1237(09)80099-3. Epub Jul. 21, 2011. Accessed via <https://pmc.ncbi.nlm.nih.gov/articles/PMC4921358/> on Jan. 13, 2025. (Year: 2009).*
International Search Report issued in corresponding International application No. PCT/CN2020/135431, mailed Sep. 9, 2021.
Written Opinion of the International Search Authority in corresponding International application No. PCT/CN2020/135431.

* cited by examiner

MEDICAL IMAGE NOISE REDUCTION METHOD, SYSTEM, TERMINAL, AND STORAGE MEDIUM

CROSS-REFERENCE TO RELATED APPLICATIONS

This application is a continuation of co-pending International Patent Application Number PCT/CN2020/135431, filed on Dec. 10, 2020, the disclosure of which is incorporated herein by reference in its entirety.

TECHNICAL FIELD

The present application relates to the technical field of medical image processing, and more particularly relates to a medical image noise reduction method, system, terminal and storage medium.

BACKGROUND

The problem of image denoising has been around for a long time. After the application of deep learning in many fields has achieved results that surpass traditional methods, deep learning has also produced many applications in image denoising, and has made great progress. The Generative adversarial network (GAN) in deep learning, due to its ingenious structure and excellent performance, is also increasingly used in the denoising of medical images.

Taking a PET (Positron Emission Tomography) image as an example, PET is a type of ECT (Emission Computed Tomography). The basic operating principle is as follows. First, a radioactive tracer is injected into the circulatory system of the human body, and then a detector is used to collect and annihilate a photon pair, so that activity intensities of different tissues in the human body can be distinguished according to the brightness difference caused by the concentrations of different components of the radioactive tracer in different tissues. It can provide three-dimensional functional, metabolic and receptor imaging images non-invasively—multi-modality imaging. However, the cumulative effect of large PET radiation doses greatly increases the possibility of various diseases, which in turn affects the physiological functions of the human body, destroys human tissues and organs, and even endangers the life safety of patients. The rational application of low-dose PET imaging technology needs to meet the clinical diagnostic requirements of PET images, while reducing the impact of radiation doses on patients as much as possible. Therefore, research and development of PET imaging with higher imaging quality under low-dose conditions has important scientific significance and broad application prospects for the current medical field.

In 2018, Y. Wang et al. published an article "3D conditional generative adversarial networks for high-quality PET image estimation at low dose" in Elsevier's NeuroImage journal, applying conditional generative adversarial networks (conditional GAN) to estimation of high-quality PET images from low-dose PET images of the brain. The technique processes images in pairs, namely a low-dose PET image (a low-quality image with noise) and a high-dose PET image (a high-quality image). The low-dose PET image serves as input to the generator in the generative adversarial network and as the condition of the discriminator, while the high-dose PET images serves as a "label" in supervised learning to be input to and train the discriminator.

In 2019, YangLei et al. published an article "Whole-body PET estimation from low count statistics using cycle-consistent generative adversarial networks" in IOP's Phys. Med Biol journal, applying the cycle generative adversarial network (CycleGAN) to estimate a high-quality PET image from a whole-body low-dose PET image. The cycle generative adversarial network mainly includes two generative adversarial networks, one generative adversarial network Obtains the denoised PET image from the low-dose PET image, and the other generative adversarial network in the opposite direction takes the denoised PET image obtained by the first generative adversarial network as input, and obtains a noisy PET image as close as possible to the original low-dose PET image. In addition to the loss function of the original generative adversarial network, the cycle generative adversarial network increases the loss function between the original low-dose PET image and the generated noisy PET image, and the loss function between the original high-quality PET image and the generated denoised PET image. These two loss functions are also called cycle-consistent loss functions) to ensure the cycle-consistency across the entire network. The original cycle generative adversarial network is used to deal with unpaired images, i.e. there is no one-to-one correspondence between low-dose PET images and high-quality PET images.

However, most of the above-mentioned solutions to the PET image denoising problem using generative adversarial networks simply transplant the structures proposed in computer vision problems. In fact, the goal of the original generative adversarial network is mainly image style transfer, or converting semantic segmentation or instance segmentation reticle into real images, which cannot be well applied to image denoising. In addition, since the Generative adversarial network was originally "unsupervised" or "weakly supervised", in order to achieve Nash equilibrium, repeated "trial and error" of the model was required, resulting in unstable model training and difficulty in convergence. Furthermore, existing low-dose PET image denoising, models based on generative adversarial networks has poor generalization performance.

SUMMARY

The present application provides a medical image noise reduction method, system, terminal and storage medium, aiming to solve one of the above-mentioned technical problems in the prior art at least to a certain extent.

In order to solve the above problems, the application provides the following technical solutions.

A medical image noise reduction method, comprising:
  obtaining a standard-dose PET image and a constant-value image;
  inputting the standard-dose PET image and the constant-value image into a decay function to obtain the respective low-dose noisy PET image and noisy constant-value image;
  assembling the low-dose noisy PET image and the noisy constant-value image in the width dimension or the height dimension, and then inputting into a trained conjugate generative adversarial network, and outputting the denoised PET image and constant-value image output through the conjugate generative adversarial network.

The technical solutions adopted in the embodiments of the present application further include: the conjugate generative adversarial network includes a generator and a discriminator;

the generator includes a reflective padding layer, a convolution layer, an instance normalization layer, a nonlinear layer, a residual module, an upsampling layer, and a nonlinear layer;

the discriminator is a convolutional neural network classifier, and the discriminator includes a convolutional layer, an instance normalization layer, and a nonlinear layer.

The technical solutions adopted in the embodiments of the present application further include: the generator includes two parts, feature extraction and image reconstruction;

In the feature extraction part, firstly, the input low-dose noisy PET image and noisy constant-value image are processed using the padding layer, the convolutional layer, the instance normalization layer and the nonlinear layer; secondly, use four groups of feature extraction modules to perform feature extraction on the low-dose noisy PET image and the noisy constant-value image; then, process the extracted features through three residual modules;

In the image reconstruction part, firstly, the PET image and the constant-value image are gradually reconstructed according to the extracted features through four upsampling modules; then the reconstructed PET image and the constant-value image are processed using the padding layer, the convolution layer and the nonlinear layer, and output denoised PET image and constant-value image.

The technical solutions adopted in the embodiments of the present application further include the following. The feature extraction module includes a convolution layer, an instance normalization layer and a nonlinear layer, where the convolution layer step size of each feature extraction module is 2; with the gradual increase of the extraction modules, the size of each side of the output feature map of the convolutional layer becomes half of that of the previous feature extraction module, and the number of the feature maps is twice that of the previous feature extraction module.

The technical solutions adopted in the embodiments of the present application further include: assembling the PET image and the constant-value image generated by the generator with the low-dose noisy PET image and the noisy constant-value image in the channel dimension respectively, and inputting them into the discriminator; then, the discriminator performs three sets of convolution, instance normalization and nonlinear operations, and finally uses a convolution layer to output the classification results of the PET image and the constant-value image generated by the generator.

The technical solutions adopted in the embodiments of the present application further include: the loss function of the conjugate generative adversarial network includes a first loss function used when training the discriminator and a second loss function used when training the generator, where the first loss function is represented by the mean square error as:

$$L_D = \mathbb{E}_{\beta \sim P_\beta}[(D(\beta, \alpha) - b)^2] + \mathbb{E}_{\alpha \sim P_\alpha}[(D(G(\alpha), \alpha) - a)^2]$$

in the above formula, D represents the discriminator network, G represents the generator network, $\mathbb{E}$ represents the expectation, $\alpha$ represents the input low-dose noisy PET image, $\beta$ represents the real standard-dose PET image, a represents 0, and b represents 1;

The second loss function is expressed as the following using one-norm loss function and mean square error loss function:

$$L_{l1} = \mathbb{E}_{\alpha \sim P_\alpha} \|G(\alpha) - \gamma\|_1$$

$$L_{gan} = \mathbb{E}_{\alpha \sim P_\alpha}[(D(G(\alpha), \alpha) - b)^2]$$

In the above formula, $\|*\|_1$ represents one norm, and $\gamma$ represents the image after assembling the real standard-dose PET image $\beta$ and the constant-value image.

The technical solutions adopted in the embodiments of the present application further include: the loss function of the conjugate generative adversarial network further includes a feature matching loss function:

$$L_{feat} = \mathbb{E}_{(\alpha,\beta)} \sum_{i=1}^{T} \frac{1}{N_i} \|D^{(i)}(\beta, \alpha) - D^{(i)}(G(\alpha), \alpha)\|_1$$

In the above formula, $D^i$ represents the i layer of the discriminator, $N_i$ represents the number of elements in each layer, and T represents the total number of layers of the discriminator.

Another technical solution adopted by the embodiments of the present application is a medical image noise reduction system, comprising:

an original image acquisition module used to obtain a standard-dose PET image and a constant-value image;

an image attenuation module used to input the standard-dose PET image and the constant-value image into a decay function to obtain the respective low-dose noisy. PET image and noisy constant-value image; and an image denoising module used to assemble the low-dose noisy PET image and the noisy constant-value image in the width dimension or the height dimension, and then inputting into a trained conjugate generative adversarial network, and outputting the denoised PET image and constant-value image output through the conjugate generative adversarial network.

Another technical solution adopted by the embodiments of the present application is a terminal, the terminal includes a processor and a memory coupled to the processor, wherein, the memory stores program instructions for implementing the medical image noise reduction method;

the processor is configured to execute the program instructions stored in the memory to control medical image noise reduction.

Another technical solution adopted by the embodiments of the present application is a storage medium storing program instructions executable by a processor, where the program instructions are used to execute the medical image noise reduction method.

Compared with the prior art, the beneficial effects of the embodiments of the present application are as follows. The medical image noise reduction method, system, terminal and storage medium of the embodiments of the present application perform medical image noise reduction by constructing a conjugate generative adversarial network, and the network structure adopts the conjugation mechanism of image conversion, which strengthens the constraints on the generative adversarial network, which can strengthen the supervision of model training, highlight the training objectives of the model, speed up the convergence speed of the model, and enable the model to learn more essential features, enhance the generalization performance of the model, and improve the stability of the model, making the training of the medical image noise reduction model easier. While improving the peak signal-to-noise ratio and structural similarity of the image, the image processing capability is enhanced, the quality of low-dose PET imaging is improved, the variance is reduced, and a more stable and reliable noise reduction effect is obtained. Furthermore, the one-norm loss function and feature matching loss function of the generated image and the real image are added, which effectively improves the quality of the generated image and can better supervise the network to approximate the real image.

BRIEF DESCRIPTION OF ACCOMPANYING DRAWINGS

DETAILED DESCRIPTION

In order to make the purpose, technical solutions and advantages of the present application more clearly understood, the present application will be described in further detail below with reference to the accompanying drawings and embodiments. It should be understood that the specific embodiments described herein are merely used to explain the present application, rather than limit the present application.

Figure 1:
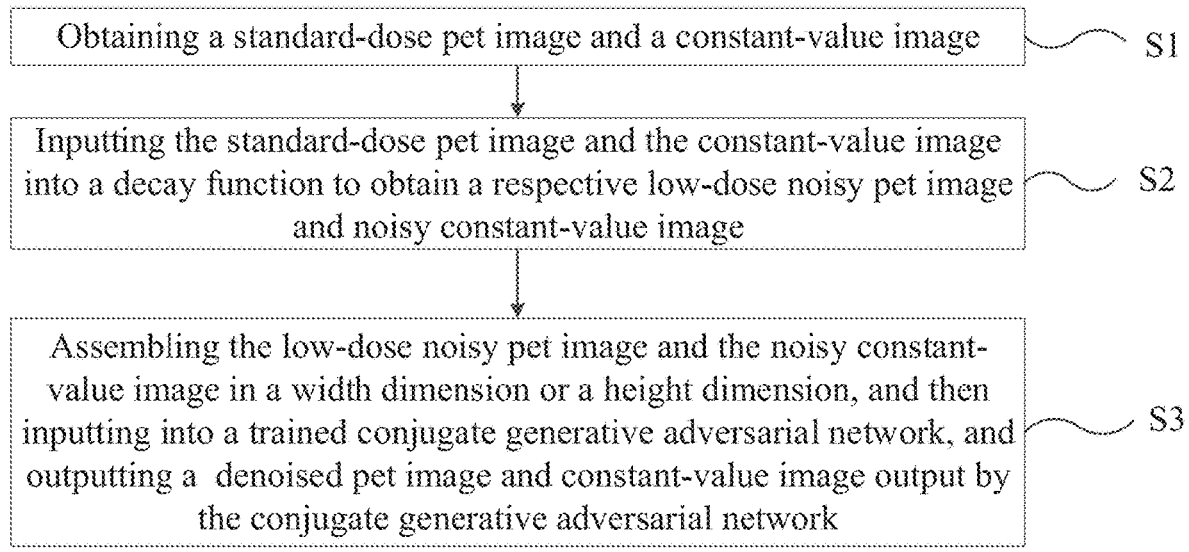
FIG. 1 is a flowchart of a medical image noise reduction method according to an embodiment of the present application.

FIG. 1 is a flowchart of a medical image noise reduction method according to an embodiment of the present application. The medical image noise reduction method according to the embodiment of the present application includes the following operations:

S1: obtaining a standard-dose PET image and a constant-value image (an image whose pixel values are all a constant);

S2: inputting the standard-dose PET image and the constant-value image into a decay function to obtain the respective low-dose noisy PET image and noisy constant-value image;

S3: assembling the low-dose noisy PET image and the noisy constant-value image in the width dimension or the height dimension, and then inputting into a trained conjugate generative adversarial network, and outputting the denoised PET image and constant-value image output through the conjugate generative adversarial;

In this operation, the low-dose noisy PET image and the noisy constant-value image are together input into the generator for processing. When the corresponding constant-value image is generated from the noisy constant-value image, the low-dose noisy PET image is also converted into a denoised PET image. This process is called "conjugation", and the generative adversarial network constructed based on this principle is called "conjugate generative adversarial network".

Figure 2:
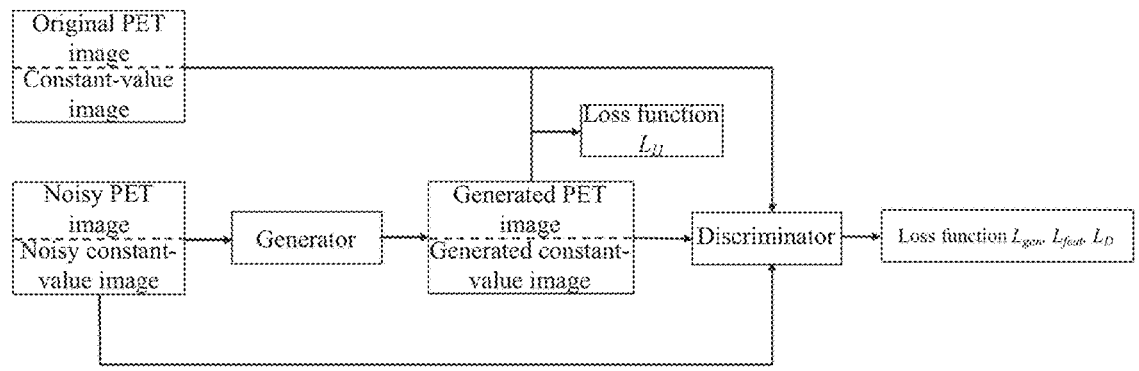
FIG. 2 is a schematic diagram of a conjugate generative adversarial network according to an embodiment of the present application.
Figure 3:
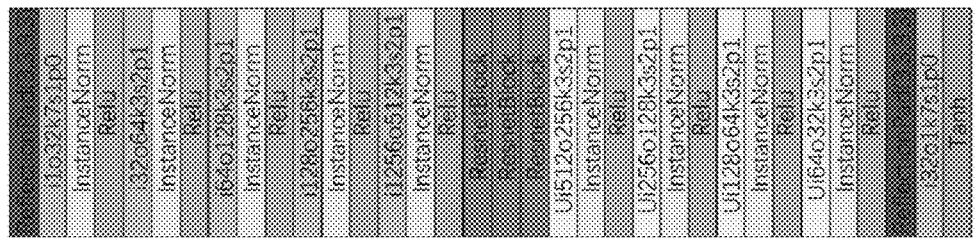
FIG. 3 is a schematic diagram of a generator according to an embodiment of the present application.

In the embodiment of this application, the structure of the conjugate generative adversarial network is shown in FIG. 2, which includes a generator G (Generator) and a discriminator D (Discriminator). The specific structure of the generator is shown in FIG. 3, which includes a reflective padding Layer "ReflectionPad(3,3,3,3)", a convolutional layer "i1o32k7s1p0", an instance normalization layer "InstanceNorm", a nonlinear layer "Relu", a residual module "ResnetBlock", an upsampling layer "Ui512o256k3s2p1", and a nonlinear layer "Tanh". The number of input channels of the convolution layer is 1, the number of output channels is 32, the size of the convolution kernel is 7*7, the step size is 1, and the padding is 0; The number of input channels of the upsampling layer is 512, the number of output channels is 256, the size of the convolution kernel is 3*3, the step size is 2, and the padding is 1, that is, the embodiment of the present application uses deconvolution to complete the upsampling operation.

The generator includes two parts: feature extraction and image reconstruction. In the feature extraction part, firstly, the input low-dose noisy PET image and noisy constant-value image are processed using the padding layer, convolution layer, instance normalization layer and nonlinear layer. Secondly, four groups of feature extraction modules are used to extract features in sequence. The feature extraction module includes a convolution layer, an instance normalization layer and a nonlinear layer, where the convolution layer step size of each feature extraction module is 2; with the gradual increase of the extraction modules, the size of each side of the output feature map of the convolutional layer becomes half of that of the previous feature extraction module, and the number of the feature maps is twice that of the previous feature extraction module. Then, the extracted features are processed using 3 residual modules.

In the image reconstruction part, firstly, the PET image and the constant-value image are gradually reconstructed according to the extracted features through four upsampling modules; then the reconstructed PET image and the constant-value image are processed using the padding layer, the convolution layer and the nonlinear layer, and output denoised PET image and constant-value image.

Figure 4:
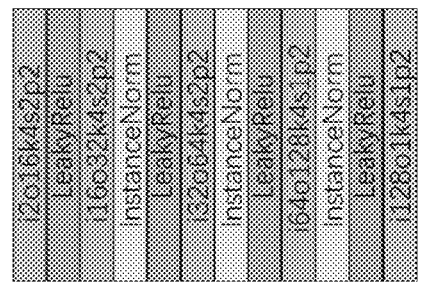
FIG. 4 is a schematic diagram of a discriminator according to an embodiment of the application.

The discriminator D is a convolutional neural network classifier, the structure of the discriminator is shown in FIG. 4, which includes a convolutional layer, an instance normalization layer, and a nonlinear layer, First, the PET image and the constant-value image generated by the generator are assembled with the low-dose noisy PET image and the noisy constant-value image in the channel dimension respectively, and then input into the discriminator; then, the discriminator performs three sets of convolution, instance normalization and nonlinear operations, and finally a convolution layer is used to output the classification results of the PET image and the constant-value image.

In the embodiment of this application, the Adam optimizer is used to train the conjugate generative adversarial network. During network training, the discriminator and the generator are trained in turn, that is, each time the discriminator is trained, the generator is trained thereafter. Therefore, the loss function of the conjugate generative adversarial network includes the first loss function used when training the discriminator and the second loss function used when training the generator. The first loss function used when training the discriminator is expressed as following using the mean squared error:

$$L_D = \mathbb{E}_{\beta \sim P_\beta}[(D(\beta, \alpha) - b)^2] + \mathbb{E}_{\alpha \sim P_\alpha}[(D(G(\alpha), \alpha) - a)^2] \quad (1)$$

in the above formula, D represents the discriminator network, G represents the generator network, $\mathbb{E}$ represents the expectation, a represents the input low-dose noisy PET image, β represents the real standard-dose PET image, α represents 0, and b represents 1;

The second loss function used in the final training generator is expressed as the following using one-norm loss function (L1) and mean square error loss function:

$$L_{l1} = \mathbb{E}_{\alpha \sim P_\alpha} \|G(\alpha) - \gamma\|_1 \quad (2)$$

$$L_{gan} = \mathbb{E}_{\alpha \sim P_\alpha}[(D(G(\alpha), \alpha) - b)^2] \quad (3)$$

In the above formulas (2) and (3), $\|*\|_1$ represents one norm, and $\gamma$ represents the image after assembling the real standard-dose PET image $\beta$ and the constant-value image.

In order to further improve the quality of the image generated by the generator, the embodiment of the present application further introduces a feature matching loss function, which can be expressed as follows:

$$L_{feat} = \mathbb{E}_{(\alpha,\beta)} \sum_{i=1}^{T} \frac{1}{N_i} \|D^{(i)}(\beta, \alpha) - D^{(i)}(G(\alpha), \alpha)\|_1 \quad (4)$$

In the above formula (4), $D^1$ represents the i layer of the discriminator, $N_i$ represents the number of elements in each layer, and T represents the total number of layers of the discriminator.

Then, the second loss function used in the final training generator is:

$$L_G = L_{gan} + \lambda_1 L_{l1} + \lambda_2 L_{feat} \quad (5)$$

in formula (5), $\lambda_1$ and $\lambda_2$ represent the weights set by the norm loss function $L_{l1}$ and the feature matching loss function $L_{feat}$, respectively.

Based on the above solutions, the medical image noise reduction method of the present application perform medical image noise reduction by constructing a conjugate generative adversarial network, and the network structure adopts the conjugation mechanism of image conversion, which strengthens the constraints on the generative adversarial network, which can strengthen the supervision of model training, highlight the training objectives of the model, speed up the convergence speed of the model, and enable the model to learn more essential features, enhance the generalization performance of the model, and improve the stability of the model, making the training of the medical image noise reduction model easier. While improving the peak signal-to-noise ratio and structural similarity of the image, the image processing capability is enhanced, the quality of low-dose PET imaging is improved, the variance is reduced, and a more stable and reliable noise reduction effect is obtained. Furthermore, the one-norm loss function and feature matching loss function of the generated image and the real image are added, which effectively improves the quality of the generated image and can better supervise the network to approximate the real image.

Figure 5:
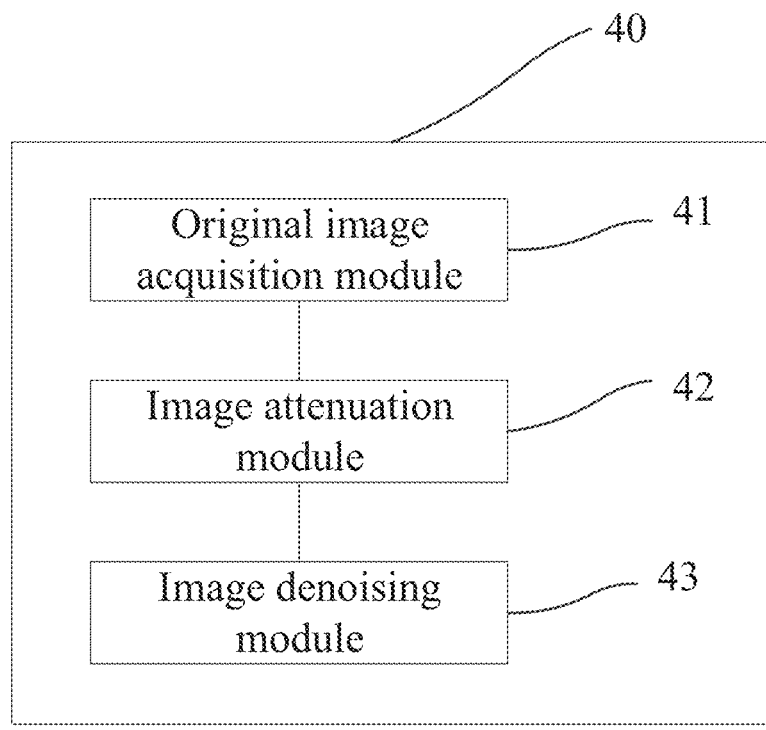
FIG. 5 is a schematic diagram of a medical image noise reduction system according to an embodiment of the present application.

FIG. 5 is a schematic diagram of a medical image noise reduction system according to an embodiment of the present application. The medical image noise reduction system 40 according to the embodiment of the present application includes:

an original image acquisition module 41 used to obtain a standard-dose PET image and a constant-value image (an image whose pixel values are all a constant);

an image attenuation module 42 used to input the standard-dose PET image and the constant-value image into a decay function to obtain the respective low-dose noisy PET image and noisy constant-value image; and an image denoising module 43 used to assemble the low-dose noisy PET image and the noisy constant-value image in the width dimension or the height dimension, and then inputting into a conjugate generative adversarial network, and outputting the denoised PET image and constant-value image output through the conjugate generative adversarial network.

Figure 6:
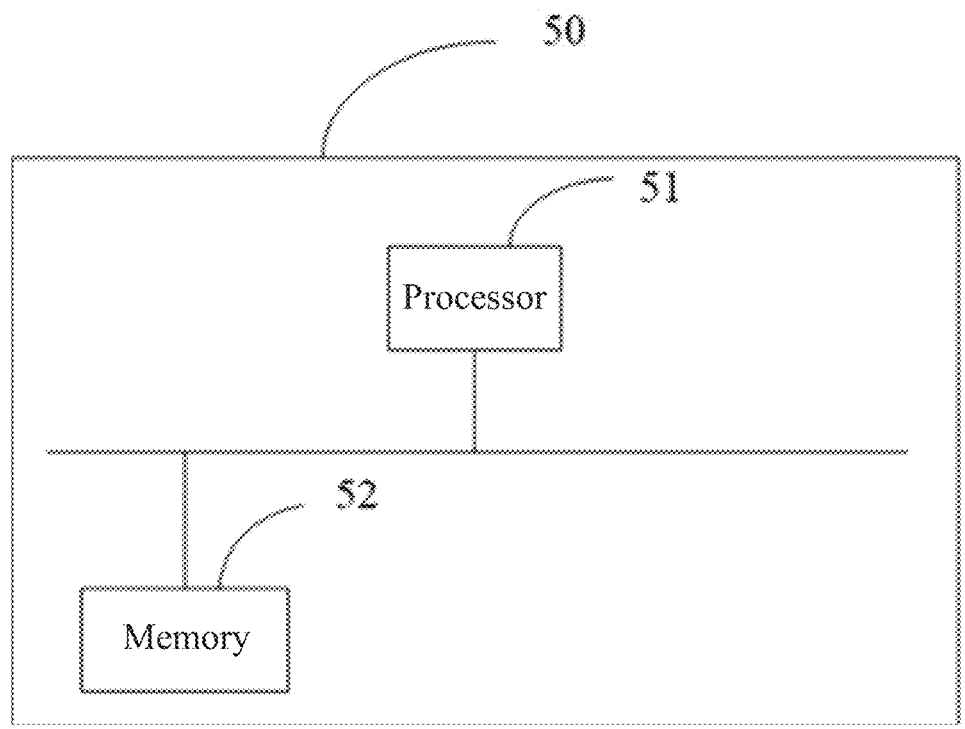
FIG. 6 is a schematic diagram of a terminal according to an embodiment of the present application.

FIG. 6 is a schematic diagram of a terminal according to an embodiment of the present application. The terminal 50 includes a processor 51 and a memory 52 coupled to the processor 51.

The memory 52 stores program instructions for implementing the medical image noise reduction methods described above.

The processor 51 is configured to execute program instructions stored in the memory 52 to control medical image noise reduction.

The processor 51 may also be referred to as a CPU (Central Processing Unit). The processor 51 may be an integrated circuit chip having signal processing capability. The processor 51 may also be a general purpose processor, digital signal processor (DSP), application specific integrated circuit (ASIC), off-the-shelf programmable gate array (FPGA) or other programmable logic devices, discrete gates or transistor logic devices, discrete hardware components. A general purpose processor may be a microprocessor or the processor may be any conventional processor or the like.

Figure 7:
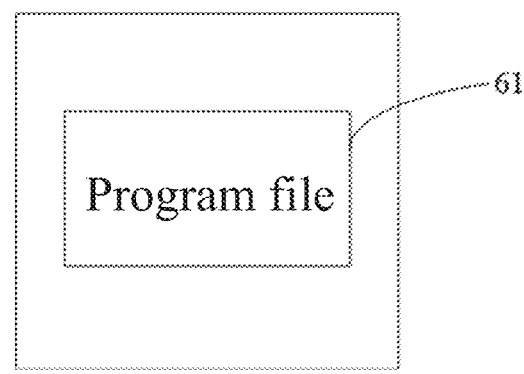
FIG. 7 is a schematic diagram of a storage medium according to an embodiment of the present application.

FIG. 7 is a schematic diagram of a storage medium according to an embodiment of the present application. The storage medium of this embodiment of the present application stores a program file 61 capable of implementing all the above methods, wherein the program file 61 may be stored in the above-mentioned storage medium in the form of a software product, and includes several instructions to make a computer device (which can be a personal computer, a server, or a network device, etc.) or a processor to execute all or some of the operations of the methods according to the various embodiments of the present disclosures. The aforementioned storage medium includes: U disk, mobile hard disk, Read-Only Memory (ROM), Random Access Memory (RAM), magnetic disk or optical disk and other media that can store program codes, or terminal devices such as computers, servers, mobile phones, and tablets.

The above description of the disclosed embodiments enables any person skilled in the art to make or use the present disclosure. Various modifications to these embodiments will be readily apparent to those skilled in the art, and the generic principles defined in this disclosure may be implemented in other embodiments without departing from the spirit or scope of this disclosure. Thus, the present disclosure is not intended to be limited to the embodiments of the present disclosure shown, but is to be accorded the widest scope consistent with the principles and novel features disclosed herein.

What is claimed is:

1. A medical image noise reduction method, comprising:
obtaining a standard-dose PET image and a constant-value image;
inputting the standard-dose PET image and the constant-value image into a decay function to obtain a respective low-dose noisy PET image and noisy constant-value image;
assembling the low-dose noisy PET image and the noisy constant-value image in a width dimension or a height dimension, and then inputting the assembly of the low-dose noisy PET image and the noisy constant-value image into a trained conjugate generative adversarial network, and outputting a denoised PET image and constant-value image output through the conjugate generative adversarial network;

wherein the conjugate generative adversarial network comprises a generator and a discriminator;

wherein the generator comprises a reflective padding layer, a convolution layer, an instance normalization layer, a nonlinear layer, a residual module, an upsampling layer, and a nonlinear layer; and wherein the discriminator is a convolutional neural network classifier, and comprises a convolutional layer, an instance normalization layer, and a nonlinear layer;

wherein the generator comprises two parts: feature extraction and image reconstruction;

wherein in the feature extraction part, the input low-dose noisy PET image and noisy constant-value image are first processed using the padding layer, the convolutional layer, the instance normalization layer and the nonlinear layer; then four groups of feature extraction modules are used to perform feature extraction on the low-dose noisy PET image and the noisy constant-value image; then the extracted features are processed using three residual modules;

wherein in the image reconstruction part, the PET image and the constant-value image are first gradually reconstructed through four upsampling modules based on the extracted features; then the reconstructed PET image and constant-value image are processed using the padding layer, the convolution layer and the nonlinear layer, and the denoised PET image and constant-value image are output.

2. The medical image noise reduction method of claim 1, wherein the feature extraction module comprises a convolution layer, an instance normalization layer, and a nonlinear layer, wherein a convolution layer step size of each feature extraction module is 2; with the gradual increase of the extraction modules, a size of each side of an output feature map of the convolutional layer becomes half of that of the previous feature extraction module, and a number of the feature maps is twice that of the previous feature extraction module.

3. The medical image noise reduction method of claim 2, wherein a loss function of the conjugate generative adversarial network comprises a first loss function used when training the discriminator and a second loss function used when training the generator, wherein the first loss function is represented by mean square error as:

$$L_D = \mathbb{E}_{\beta \sim P_\beta}[(D(\beta, \alpha)-b)^2] + \mathbb{E}_{\alpha \sim P_\alpha}[(D(G(\alpha), \alpha)-a)^2]$$

where in the above formula, D represents a discriminator network, G represents a generator network, $\mathbb{E}$ represents an expectation, $\alpha$ represents the input low-dose noisy PET image, $\beta$ represents a real standard-dose PET image, a represents 0, and b represents 1;

wherein the second loss function is expressed as the following using one-norm loss function and mean square error loss function:

$$L_{l1} = \mathbb{E}_{\alpha \sim P_\alpha} \|G(\alpha) - \gamma\|_1$$

$$L_{gan} = \mathbb{E}_{\alpha \sim P_\alpha}[(D(G(\alpha), \alpha)-b)^2]$$

where in the above formula, $\|*\|_1$ represents one norm, and $\gamma$ represents the image after assembling the real standard-dose PET image $\beta$ and the constant-value image.

4. The medical image noise reduction method of claim 1, wherein the PET image and the constant-value image generated by the generator are assembled with the low-dose noisy PET image and the noisy constant-value image in a channel dimension respectively, and then input into the discriminator, wherein assembling in the channel dimension comprises concatenating the PET image and the constant-value image generated by the generator and the low-dose noisy PET image and the noisy constant-value image by any side having the same size or by stacking along a new dimension; then the discriminator performs three sets of convolution, instance normalization, and nonlinear operations, and finally a convolution layer is used to output a classification result of the PET image and the constant-value image generated by the generator.

5. The medical image noise reduction method of claim 4, wherein a loss function of the conjugate generative adversarial network comprises a first loss function used when training the discriminator and a second loss function used when training the generator, wherein the first loss function is represented by mean square error as:

$$L_D = \mathbb{E}_{\beta \sim P_\beta}[(D(\beta, \alpha)-b)^2] + \mathbb{E}_{\alpha \sim P_\alpha}[(D(G(\alpha), \alpha)-a)^2]$$

where in the above formula, D represents a discriminator network, G represents a generator network, $\mathbb{E}$ represents an expectation, $\alpha$ represents the input low-dose noisy PET image, $\beta$ represents a real standard-dose PET image, a represents 0, and b represents 1;

wherein the second loss function is expressed as the following using one-norm loss function and mean square error loss function:

$$L_{l1} = \mathbb{E}_{\alpha \sim P_\alpha} \|G(\alpha) - \gamma\|_1$$

$$L_{gan} = \mathbb{E}_{\alpha \sim P_\alpha}[(D(G(\alpha), \alpha)-b)^2]$$

where in the above formula, $\|*\|_1$ represents one norm, and $\gamma$ represents the image after assembling the real standard-dose PET image $\beta$ and the constant-value image.

6. The medical image noise reduction method of claim 1, wherein a loss function of the conjugate generative adversarial network comprises a first loss function used when training the discriminator and a second loss function used when training the generator, wherein the first loss function is represented by mean square error as:

$$L_D = \mathbb{E}_{\beta \sim P_\beta}[(D(\beta, \alpha)-b)^2] + \mathbb{E}_{\alpha \sim P_\alpha}[(D(G(\alpha), \alpha)-a)^2]$$

where in the above formula, D represents a discriminator network, & represents a generator network, $\mathbb{E}$ represents an expectation, $\alpha$ represents the input low-dose noisy PET image, $\beta$ represents a real standard-dose PET image, $\alpha$ represents 0, and b represents 1;

wherein the second loss function is expressed as the following using one-norm loss function and mean square error loss function:

$$L_{l1} = \mathbb{E}_{\alpha \sim P_\alpha} \|G(\alpha) - \gamma\|_1$$

$$L_{gan} = \mathbb{E}_{\alpha \sim P_\alpha}[(D(G(\alpha), \alpha)-b)^2]$$

where in the above formula, $\|*\|_1$ represents one norm, and $\gamma$ represents the image after assembling the real standard-dose PET image $\beta$ and the constant-value image.

7. The medical image noise reduction method of claim 6, wherein the loss function of the conjugate generative adversarial network further comprises a feature matching loss function:

$$L_{feat} = \mathbb{E}_{(\alpha,\beta)} \sum_{i=1}^{T} \frac{1}{N_i} \|D^{(i)}(\beta, \alpha) - D^{(i)}(G(\alpha), \alpha)\|_1$$

where in the above formula, $D^i$ represents an ith layer of the discriminator, $N_i$ represents a number of elements in each layer, and T represents a total number of layers of the discriminator.

8. A terminal, comprising a processor and a non-transitory computer-readable memory that is coupled to the processor, wherein the non-transitory computer-readable memory is configured to store program instructions for implementing the medical image noise reduction method of claim 1;
the processor is configured to execute the program instructions stored in the non-transitory computer-readable memory to perform medical image noise reduction.

9. The terminal of claim 8, wherein the feature extraction module comprises a convolution layer, an instance normalization layer, and a nonlinear layer, wherein a convolution layer step size of each feature extraction module is 2; with the gradual increase of the extraction modules, a size of each side of an output feature map of the convolutional layer becomes half of that of the previous feature extraction module, and a number of the feature maps is twice that of the previous feature extraction module.

10. The terminal of claim 8, wherein the PET image and the constant-value image generated by the generator are assembled with the low-dose noisy PET image and the noisy constant-value image in a channel dimension respectively, and then input into the discriminator, wherein assembling in the channel dimension comprises concatenating the PET image and the constant-value image generated by the generator and the low-dose noisy PET image and the noisy constant-value image by any side having the same size or by stacking along a new dimension; then the discriminator performs three sets of convolution, instance normalization, and nonlinear operations, and finally a convolution layer is used to output a classification result of the PET image and the constant-value image generated by the generator.

11. The medical image noise reduction method of claim 8, wherein a loss function of the conjugate generative adversarial network comprises a first loss function used when training the discriminator and a second loss function used when training the generator, wherein the first loss function is represented by mean square error as:

$$L_D = \mathbb{E}_{\beta \sim P_\beta}[(D(\beta, \alpha)-b)^2] + \mathbb{E}_{\alpha \sim P_\alpha}[(D(G(\alpha), \alpha)-a)^2]$$

where in the above formula, D represents a discriminator network, G represents a generator network, $\mathbb{E}$ represents an expectation, $\alpha$ represents the input low-dose noisy PET image, $\beta$ represents a real standard-dose PET image, @ represents 0, and b represents 1;

wherein the second loss function is expressed as the following using one-norm loss function and mean square error loss function:

$$L_{l1} = \mathbb{E}_{\alpha \sim P_\alpha} \|G(\alpha)-\gamma\|_1$$

$$L_{gan} = \mathbb{E}_{\alpha \sim P_\alpha}[(D(G(\alpha), \alpha)-b)^2]$$

where in the above formula, $\|*\|_1$ represents one norm, and $\gamma$ represents the image after assembling the real standard-dose PET image $\beta$ and the constant-value image.

12. A non-transitory computer-readable storage medium, storing program instructions executable by a processor, wherein the program instructions are used to execute the medical image noise reduction method of claim 1.

\* \* \* \* \*